(12) United States Patent
Shou et al.

(10) Patent No.: US 6,240,148 B1
(45) Date of Patent: *May 29, 2001

(54) PATH-DIVERSITY RECEIVING METHOD AND SYSTEM OF SPREAD SPECTRUM COMMUNICATION

(75) Inventors: Guoliang Shou; Changming Zhou; Xuping Zhou, all of Tokyo; Mamoru Sawahashi; Fumiyuki Adachi, both of Yokohama, all of (JP)

(73) Assignees: NTT Mobile Communications Network, Inc.; Yozan Inc., both of Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,919

(22) Filed: Aug. 8, 1997

(30) Foreign Application Priority Data

Aug. 9, 1996 (JP) .................................................... 8-227554

(51) Int. Cl.[7] ....................................................... H04B 7/10
(52) U.S. Cl. ............................................................. 375/347
(58) Field of Search .................................... 375/130, 367, 375/347

(56) References Cited

U.S. PATENT DOCUMENTS

| 4,313,211 | | 1/1982 | Leland ................................. 455/203 |
| 5,694,388 | * | 12/1997 | Sawahashi et al. ................ 370/206 |
| 5,727,032 | * | 3/1998 | Jamal et al. ........................ 375/347 |
| 5,787,112 | * | 7/1998 | Murai ................................. 375/206 |

FOREIGN PATENT DOCUMENTS

| 661831 | 7/1995 | (EP) . |
| WO 91/20142 | 12/1991 | (WO) . |

OTHER PUBLICATIONS

Yoshio Honda and Karin Jamal, Channel Estimation Based on Time–Multiplexed Pilot Symbols, Technical Report of IEICE, RCS96–70 (1996–08).

Seiichi Sampei, Rayleigh Fading Compensation Method for 16QAM Modem in Digital Land Mobile Radio System, IEICE B–II, Jan. 1989, pp. 7–15, vol. J72–B–II No. 1.

* cited by examiner

Primary Examiner—Chi Pham
Assistant Examiner—Khai Tran
(74) Attorney, Agent, or Firm—Pillsbury Winthrop LLP

(57) ABSTRACT

The present invention provides a path-diversity system featuring a small-size phase compensating circuit. This circuit calculates a compensating coefficient according to the signals of a pilot block or a pair of pilot blocks surrounding an information block, and then compensates information signals thereafter by the calculated compensating coefficient.

5 Claims, 3 Drawing Sheets

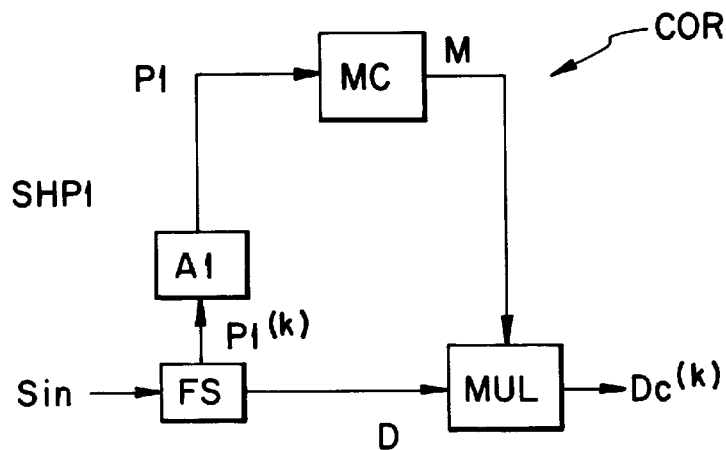
FIG. 4
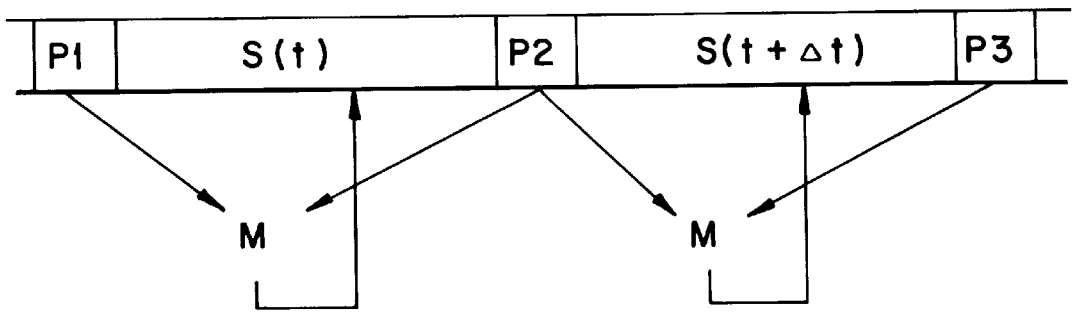
FIG. 5 *(PRIOR ART)*
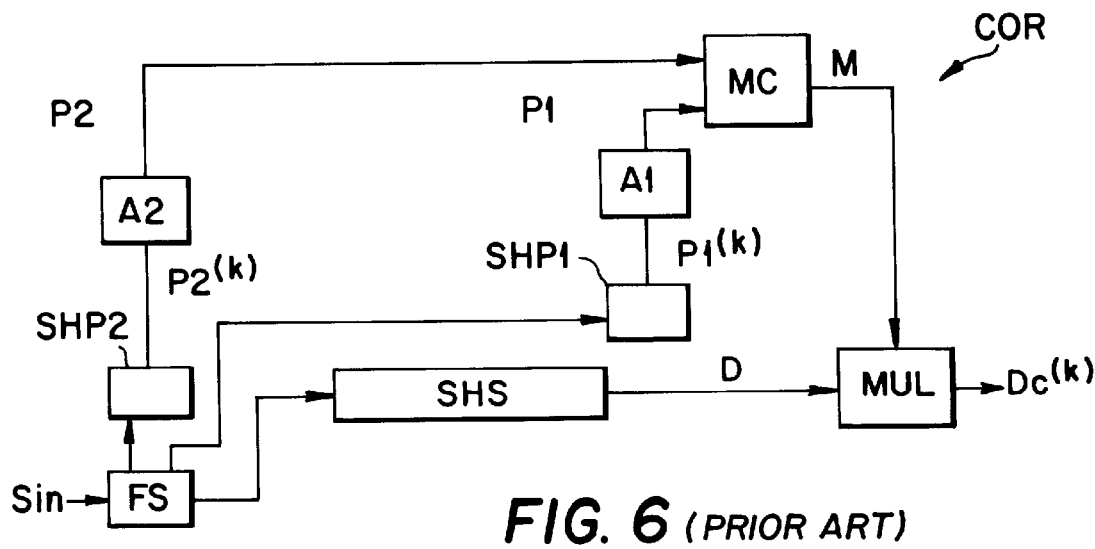
FIG. 6 *(PRIOR ART)*

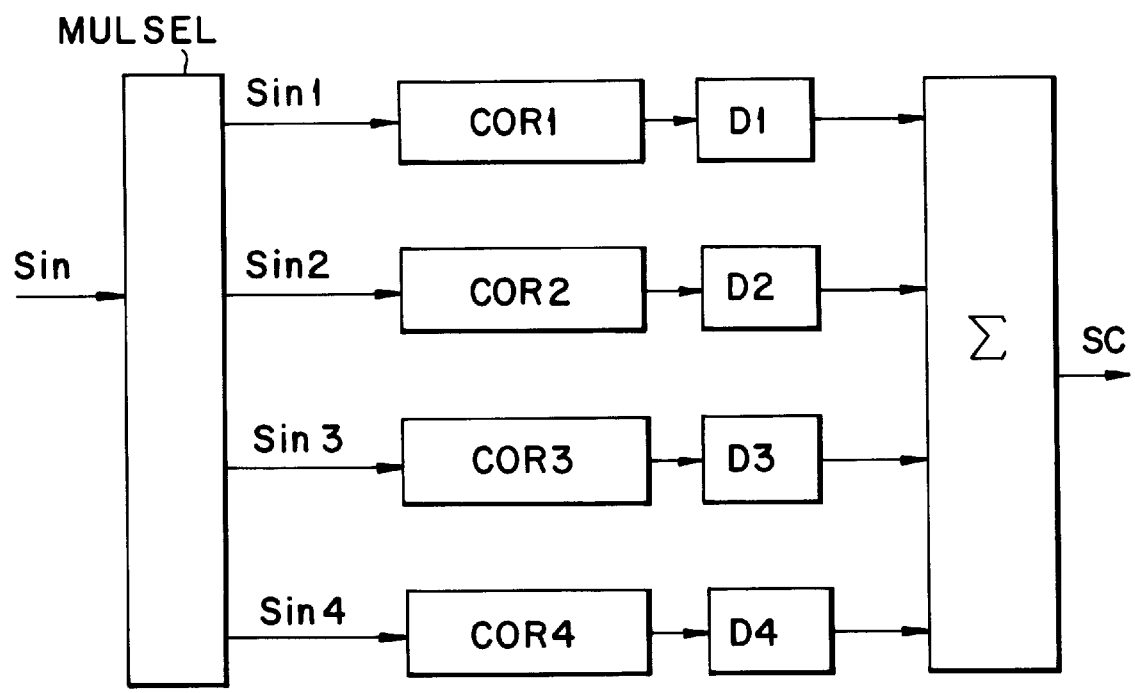
FIG. 7 *(PRIOR ART)*

PATH-DIVERSITY RECEIVING METHOD AND SYSTEM OF SPREAD SPECTRUM COMMUNICATION

FIELD OF THE INVENTION

The present invention relates to spread spectrum communications for mobile communications and wireless Local Area Networks, especially a path-diversity receiving system in which pilot signals are included in information signals.

BACKGROUND OF THE INVENTION

In spread spectrum communications, there must be compensation in signals like processing for errors due to fading in the received signals.

FIG. 5 shows such signals, in which known pilot signals P1 and P2 (signals with a plurality of bits, for example, Np bits) are input before and after the predetermined quantity of information signal S(t) (a signal with a plurality of bits). According to these pilot signals, phase errors caused by fading are presumed with respect to the signals between the pilot signals, and compensated. Here, assuming that the pilot signals are $(P1^{(k)}i+j \cdot P1^{(k)}q)$ and $(P2^{(k)}i+j \cdot P2^{(k)}q)$, each information signal symbol is $(Di+j \cdot Dq)$, $P1^{(k)}$ and $P2_{(k)}$ with bits P1 and P2, respectively, being averaged by averaging circuits A1 and A2, and all the pilot signals in the send mode are $(1+j \cdot 0)$ (other patterns can be adopted), the average value E of information signal error vectors is expressed by formulas (1) to (5):

$$E = \frac{P1i + P2i}{2} + j \cdot \frac{P1q + P2q}{2} \quad (1)$$

$$P1i = \frac{1}{Np} \sum_{k=1}^{Np} P1^{(k)}i \quad (2)$$

$$P1q = \frac{1}{Np} \sum_{k=1}^{Np} P1^{(k)}q \quad (3)$$

$$P2i = \frac{1}{Np} \sum_{k=1}^{Np} P2^{(k)}i \quad (4)$$

$$P2q = \frac{1}{Np} \sum_{k=1}^{Np} P2^{(k)}q \quad (5)$$

Compensating vector M according to the formulas above is given by a complex conjugate number. P1i, P1q, P2i and P2q are the average values of the pilot signal trains, which reduce the influence of noise. The compensation coefficient is calculated by formula (6):

$$M = Mi + j \cdot Mq = \frac{P1i + P2i}{2} - j \cdot \frac{P1q + P2q}{2} \quad (6)$$

Multiplying the value of formula (6) by each information signal symbol, compensates the influence of fading. When Dc stands for the compensated information symbol, it is calculated by formula (7):

$$Dc = D \cdot M = (Di+j \cdot Dq)(Mi+j \cdot Mq) = (Di \cdot Mi - Dq \cdot Mq) + j \cdot (Dq \cdot Mi + Di \cdot Mq) \quad (7)$$

Assuming the in-phase components and the quadrature components after the compensation of N numbers of paths to be Dci1 to DciN and Dcq1 to DcqN, respectively, the in-phase components Dci and quadrature components Dcq of signals after rake composition are calculated by accumulations of signals in each path as in formulas (8) and (9):

$$Dci = \sum_{k=1}^{N} Dcik \quad (8)$$

$$Dcq = \sum_{k=1}^{N} Dcqk \quad (9)$$

FIG. 6 shows the phase compensating circuit COR for performing each processing above. In FIG. 6, receiving signal Sin undergoes proper timing adjustment and is input to two pilot signal holding circuits SHP1 and SHP2 and information signal holding circuit SHS. Each bit P1(k) and P2(k) of P1 and P2 held by SHP1 and SHP2, respectively, is averaged by averaging circuit A1 and A2, respectively, and pilot signals P1 and P2 are calculated. Compensation coefficient calculating circuit MC calculates compensation coefficient M according to these pilot signals. Compensation coefficient M is input to multiplication circuit MUL, multiplied by information signal D, and the signal Dck is output after compensation.

FIG. 7 shows a rake processing circuit which also performs phase compensation of a plurality of paths (four paths in FIG. 7 as an example). First, multipath signals greater than a predetermined level are selected among the input signals by multipath selecting circuit MULSEL. The selected signals are input to compensation circuits COR1 to COR4, arrayed in four phases corresponding to the first to the fourth paths, respectively. Their outputs are then input to accumulating circuit Σ after being appropriately delayed by delaying circuits D1 to D4, respectively. Outputs SCs of Σ correspond to Dci and Dcq above.

SUMMARY OF THE INVENTION

Conventional path-diversity receiving systems store considerably more data in their information holding circuits, and their phase compensating circuits have necessarily been large-size.

The present invention solves the above problem provides a path-diversity system with a small-size phase compensating circuit.

A path-diversity receiving system for spread spectrum communications according to the present invention calculates the compensating coefficient according to the signals of two pilot blocks prior to the information signals, or to the signal of a single pilot block just prior to the information signals, and compensates them by the compensating coefficient.

BRIEF DESCRIPTION OF THE DRAWINGS

FIG. 4 shows a block diagram of a phase compensating circuit for the second embodiment.

FIG. 5 shows a conceptual diagram of a conventional receiving system.

FIG. 6 shows a block diagram of a conventional phase compensating circuit.

FIG. 7 shows a block diagram of a path-diversity receiving system.

PREFERRED EMBODIMENT OF THE PRESENT INVENTION

Hereinafter, the first embodiment of a path-diversity receiving system according to the present invention is described with reference to the attached drawings.

Figure 1:
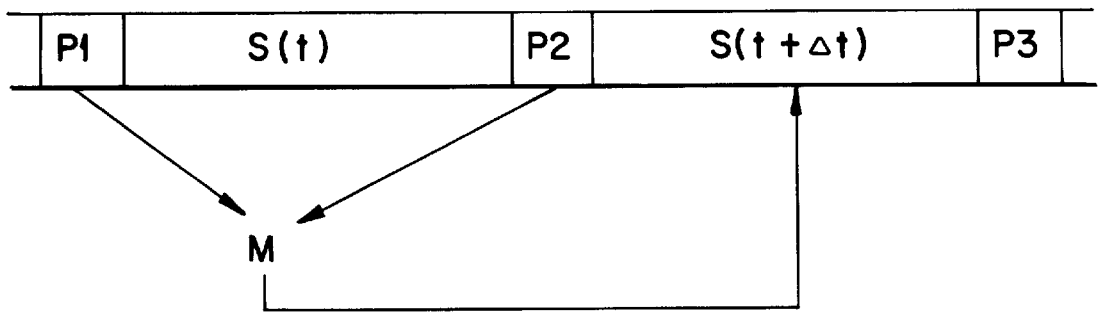
FIG. 1 shows a conceptual diagram of the first embodiment of a path-diversity receiving system according to the present invention.

In the signal train in FIG. 1, assuming that the information signal between pilot signals P1 and P2 is S(t), and that on the next point is S(t+Δt), the compensation coefficient M calculated according to pilot signals P1 and P2 is used to compensate the information signal S(t+Δt). That is, to compensate an information signal on a point, a compensating coefficient according to the pilot signal prior to that point is used. Therefore, the information signal which should be held for compensation is only the information symbol just on the point to multiply the compensation coefficient.

Figure 2:
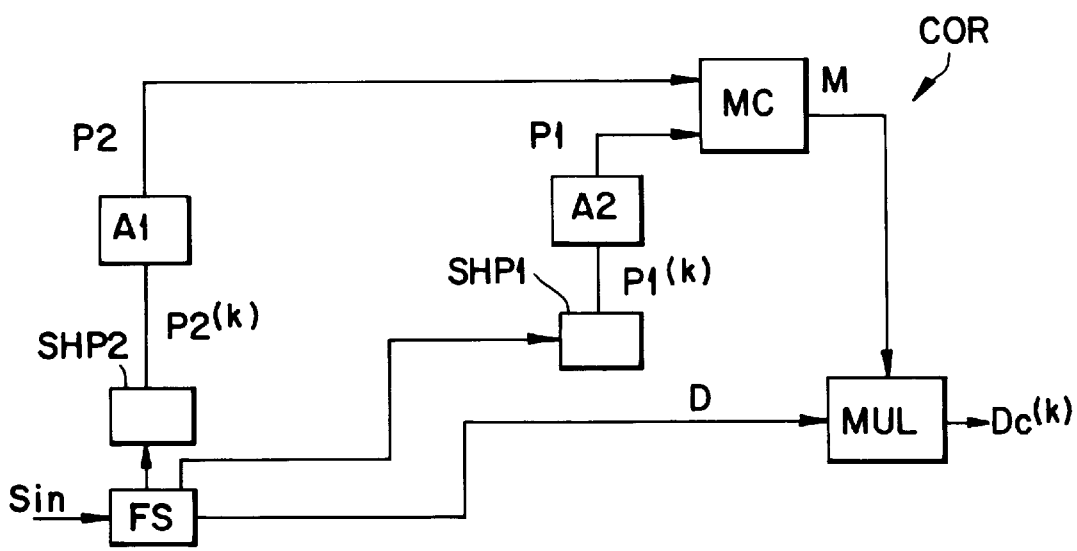
FIG. 2 shows a block diagram of a phase compensating circuit for the first embodiment.

FIG. 2 shows a phase compensating circuit for the first embodiment, with all components the same as or corresponding to those in FIG. 6 given the same symbols. This circuit differs from conventional ones by eliminating the information signal holding circuit. Conventionally, a holding capacity with the size of S(t) was necessary, for example, 36 symbols (=72 bits), but the present invention does not need such a capacity. When four-path processing is performed as in FIG. 7, the conventional holding capacity should be enough for 288 bits; however, the present invention can eliminate the holding circuit.

In such a way, a phase compensating circuit can be small-sized.

Figure 3:
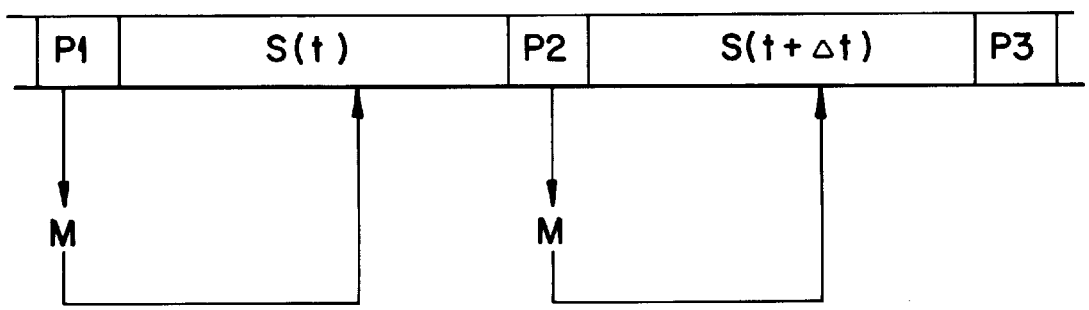
FIG. 3 shows a conceptual diagram of the second embodiment of the present invention.

FIG. 3 shows the second embodiment, wherein pilot block signal P1 is used to compensate the information signal S(t) in the block just after it. Compensating coefficient M calculated according to pilot signal P1 is used to compensate information signal S(t). That is, compensating an information signal on a given point entails using the compensating coefficient according to the pilot signal at the point just before it. Therefore, information signals can be compensated in real time, and need not be held.

FIG. 4 shows a phase compensating circuit for the second embodiment, with all components the same as or corresponding to those in FIG. 2 given the same symbols. In FIG. 4, receiving signals Sin are divided into a pilot block and an information signal block in frame synchronizing circuit FS, and so only the pilot signals are input to averaging circuit A1, and information signals are input to multiplication circuit MUL. The outputs of A1 are input to compensating coefficient calculating circuit MC, and compensating coefficient M is input to MUL from MC.

Compared with the first embodiment, this whole circuit is simplified because sampling and holding circuits SHP1 and SHP2 are eliminated, and only one averaging circuit is adequate.

As mentioned above, in the path-diversity receiving system for spread spectrum communications of the present invention, the phase compensating circuit is small because the compensating coefficient is calculated according to the signals of two pilot blocks prior to the information signals, or according to the signals of one pilot block just prior to them.

What is claimed is:

1. A path-diversity receiving method for (i) receiving a signal from successive information signal blocks, each adjacent pair of the information signal blocks being partitioned by a pilot signal block, and (ii) for compensating phase of an information signal in each of the information signal blocks, the method comprising:

calculating a plurality of compensation coefficients, each coefficient of the plurality (i) corresponding to the information signal in one of the information signal blocks and (ii) being calculated in accordance with a number of pilot signals of a corresponding number of pilot signal blocks, said number of pilot signal blocks being entirely received prior to the one information signal block; and compensating the phase of each of the information signals in accordance with the corresponding compensation coefficient.

2. A path-diversity receiving method according to claim 1, wherein the number of pilot signals is at least one pilot signal block before the corresponding information signal block.

3. A path-diversity receiving method according to claim 1, wherein the number of pilot signals is two successive pilot signal blocks before the corresponding information signal block.

4. A path-diversity receiving method according to claim 1, wherein calculating each of the plurality of compensation coefficients includes:

calculating a plurality of error vectors according to the number of pilot signals;

calculating an average of the plurality of vectors; and calculating the compensating coefficient according to the average of the vectors.

5. A path-diversity receiving system for a spread spectrum communication system comprising:

a number of pilot signal holding circuits for holding pilot signals in a corresponding number of successive pilot signal blocks, each block including a plurality of pilot signals;

an averaging circuit respectively corresponding to each of the number of pilot signal holding circuits, and for calculating an average of the plurality of pilot signals in each pilot signal block; and a compensation coefficient calculation circuit for calculating a compensation coefficient in accordance with averages of the pilot signals of the successive pilot signal blocks, the compensation coefficient being applied in real-time to an information signal in an information signal block having information signals received after the pilot signals of the pilot signal blocks.

* * * * *